(12) United States Patent
Iori

(10) Patent No.: US 10,244,897 B2
(45) Date of Patent: Apr. 2, 2019

(54) SPATULA FOR CULINARY USE

(71) Applicant: TECHFOOD SNC DI IORI ANGELO E CASTAGNETTI PAOLA, Castelnovo di Sotto (RE) (IT)

(72) Inventor: Angelo Iori, Reggio Emilia (IT)

(73) Assignee: TECHFOOD SNC DI IORI ANGELO E CASTAGNETTI PAOLA, Castelnovo di Sotto (RE) (IT)

( * ) Notice: Subject to any disclaimer, the term of this patent is extended or adjusted under 35 U.S.C. 154(b) by 127 days.

(21) Appl. No.: 15/297,893

(22) Filed: Oct. 19, 2016

(65) Prior Publication Data

US 2017/0105582 A1    Apr. 20, 2017

(30) Foreign Application Priority Data

Oct. 20, 2015   (IT) .................... IT102015000063204

(51) Int. Cl.
| | |
|---|---|
| *A47J 43/28* | (2006.01) |
| *A23G 9/44* | (2006.01) |
| *A23G 9/22* | (2006.01) |
| *A23G 9/08* | (2006.01) |

(52) U.S. Cl.
CPC .............. *A47J 43/288* (2013.01); *A23G 9/08* (2013.01); *A23G 9/22* (2013.01); *A23G 9/224* (2013.01); *A23G 9/44* (2013.01)

(58) Field of Classification Search
CPC . A23G 9/224; A23G 9/22; A23G 9/08; A23G 9/44; A47J 43/28; A47J 43/288; A47L 13/02–13/08

USPC ................. 426/524, 515, 512, 500–501; 30/169–172
See application file for complete search history.

(56) References Cited

U.S. PATENT DOCUMENTS

| | | | | |
|---|---|---|---|---|
| 1,380,757 A | * | 6/1921 | Van Sant | F25C 5/043 30/128 |
| 1,431,344 A | * | 10/1922 | Van Sant | A23G 9/045 30/136.5 |
| 1,505,448 A | * | 8/1924 | Van Sant | A23G 9/045 30/136.5 |

(Continued)

FOREIGN PATENT DOCUMENTS

JP    2007275007 A    10/2007

OTHER PUBLICATIONS

Awesome Eats: "How to make Thai Ice Cream", Aug. 11, 2014 (Aug. 11, 2014) Retrieved from the Internet: URL:https://www.youtube.com/watch?v=fKv-sppdf_4 [retrieved on Mar. 2, 2016].

(Continued)

*Primary Examiner* — Drew E Becker
(74) *Attorney, Agent, or Firm* — Whitmyer IP Group LLC

(57) ABSTRACT

A spatula is disclosed that is used to implement a food preparation method having the object of forming a roll of ice-cream, in which a quantity of food product in liquid or creamy state, consisting of a basic preparation for ice-cream, is spread on a controlled cooling plane at a temperature of about −18° C., to form in a few seconds a layer of ice-cream, changed into solid or pasty state, which is subsequently scraped away by the spatula, the latter having an upper side from which a protrusion emerges that, during scraping, meets the scraped-away ice-cream and deflects the ice-cream, promoting the rolling up thereof.

15 Claims, 3 Drawing Sheets

(56) References Cited

U.S. PATENT DOCUMENTS

| | | | | |
|---|---|---|---|---|
| 1,898,747 A * | 2/1933 | Schacht | A47L 13/08 30/169 |
| 2,025,757 A * | 12/1935 | Lindsey | A23G 9/163 165/94 |
| 2,146,419 A * | 2/1939 | Clarke | A23G 9/045 30/136.5 |
| 2,169,414 A * | 8/1939 | Giddings | B26B 5/00 30/172 |
| 2,236,323 A * | 3/1941 | Stachowiak | A47L 13/08 30/169 |
| 2,262,316 A * | 11/1941 | Brugman | A47L 13/022 15/145 |
| 2,558,335 A * | 6/1951 | Bert | F25C 5/043 30/136.5 |
| 2,630,591 A * | 3/1953 | Smith | A47J 43/282 15/105 |
| D172,537 S * | 7/1954 | Hill | 15/236.01 |
| 2,946,076 A * | 7/1960 | Morgan | A47L 1/16 15/145 |
| 3,274,684 A * | 9/1966 | Marks | E01H 5/02 15/105 |
| 3,730,579 A * | 5/1973 | Mock | A47J 43/288 294/8 |
| 3,787,921 A * | 1/1974 | Feldmann | A47L 1/16 15/105 |
| D232,151 S * | 7/1974 | Spydevold | D32/41 |
| 4,202,093 A * | 5/1980 | Wallerstein | A47L 13/08 15/236.01 |
| 4,719,660 A * | 1/1988 | Hopkins | B60S 3/045 15/105 |
| 4,890,351 A * | 1/1990 | Wilson | A47J 43/288 15/236.01 |
| 4,922,569 A * | 5/1990 | Brinker | A47L 1/16 15/105 |
| 4,962,561 A * | 10/1990 | Hamilton | A46B 5/02 15/111 |
| 5,176,418 A * | 1/1993 | Niu | A47J 43/288 294/7 |
| 5,787,588 A * | 8/1998 | Tisbo | A01B 1/00 294/54.5 |
| D456,576 S * | 4/2002 | Philipson | D32/49 |
| 6,745,595 B1 * | 6/2004 | Kateman | F25C 1/12 165/168 |
| 9,167,889 B1 * | 10/2015 | Ihde | A46B 15/0055 |
| D751,781 S * | 3/2016 | Blouin | D32/46 |
| 2004/0231087 A1 | 11/2004 | Siegel et al. | |
| 2005/0229438 A1 * | 10/2005 | Douziech | E01H 5/02 37/285 |
| 2008/0053111 A1 * | 3/2008 | Walker | A23L 3/36 62/56 |
| 2013/0174367 A1 * | 7/2013 | Johnstone | A47L 13/08 15/144.4 |

OTHER PUBLICATIONS

Italian Search Report & Written Opinion Application No. ITUB20154912 Completed: Jun. 7, 2016 8 pages.

* cited by examiner

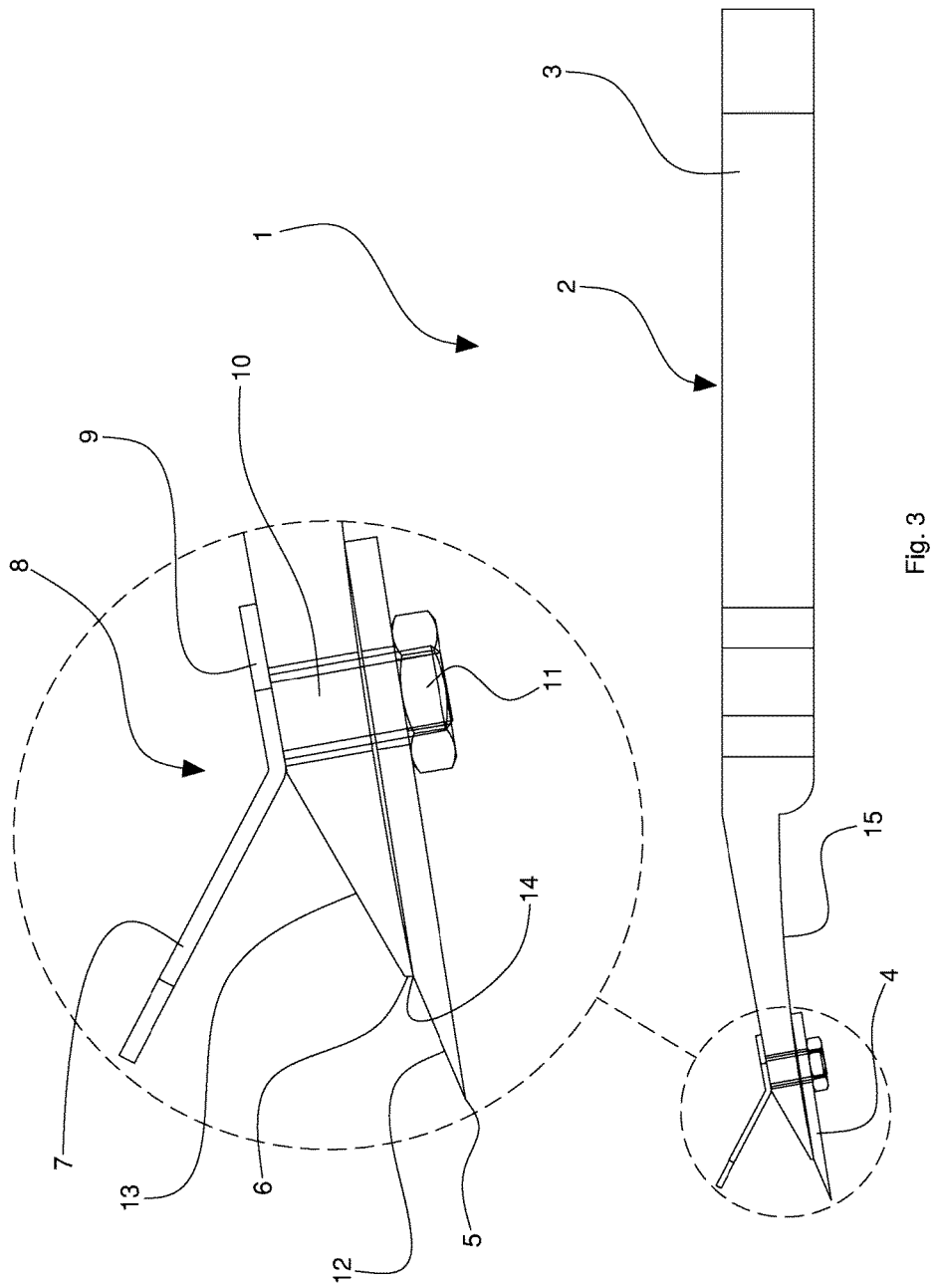

SPATULA FOR CULINARY USE

TECHNICAL FIELD

The invention relates to a spatula for culinary use and a food preparation method that uses this spatula.

BACKGROUND

Specifically, but not exclusively, the invention can be used to form a roll of ice-cream by using a spatula to scrape a layer of a basic preparation for ice-cream previously spread and whipped on a cooling plane.

In particular, reference is made to a food preparation method for forming a food product into the form of a roll by a spatula used for scraping a layer of the product distributed on a work plane.

A method is already known for producing ice-cream in the form of a roll, in which a quantity of a food product is placed on a cooling plane and is then worked, generally with two spatulas, to whip and homogenise the product and then detach a roll of ice-cream by scraping.

The method of known type nevertheless has various limits and drawbacks and the technique used until today is improvable from various points of view.

Firstly, it would be desirable to be able to obtain the desired product, rolled on itself several times, i.e. with various winding revolutions, in a simple, guaranteed and repeated manner. The prior art does not ensure this result, as the formation of a roll wound correctly on itself depends on multiple factors that are not always easily controllable, such as, for example, the skill of the cook, the temperature of the cooling plane, the composition of the food product, the environment in which the culinary preparation occurs, etc.

Secondly, the prior art entails a time for preparing a single portion of product that is relatively long (up to two or three minutes), with the risk of forming long lines of waiting customers.

Further, the prior art provides for the preparation of the product being concluded when the cook observes visually that the desired whipping has been achieved on the cooling plane, with a great risk of human error, in particular with the danger of excessive freezing of the product.

Another drawback of the prior art is represented by the fact that generally more energy than necessary is consumed to maintain the cooling plane at a suitable temperature for forming the roll of ice-cream, without nevertheless ensuring the formation of a product that is rolled several times on itself.

SUMMARY

One object of the invention is to overcome one or more of the aforesaid limits and drawbacks of the prior art.

One advantage is to provide a food preparation method for forming a product into the form of a roll obtained by scraping a work surface.

One advantage is to make a scraping spatula for culinary use that is suitable for implementing a food preparation method that is suitable for forming a product in the shape of a roll by scraping a work surface.

One advantage is to providing a spatula and a method of use of the spatula so as to ensure a product that is correctly rolled several times on itself.

One advantage is to provide a spatula for culinary use that is constructionally simple and cheap and of easy and immediate use.

One advantage is to ensure the repeatability of a food preparation method for forming an ice-cream in the form of a roll.

One advantage is to make available a food preparation method that is able to reduce significantly, with respect to the prior art, the time that is necessary for forming an ice-cream into the form of a roll obtained by scraping a cooling plane.

Such objects and advantages, and still others, are achieved by the method and by the spatula according to one or more of the claims set out below.

In one embodiment, a spatula is used in a food preparation method to form a roll of product (for example a roll of ice-cream), in which a quantity of food product in liquid or creamy state, comprising for example a basic preparation for ice-cream, is spread on a cooling work plane that is controlled at a desired temperature, for example of about −18° C., to give rise to a layer of product, changed into solid or pasty state, that is subsequently scraped away from the plane by the aforesaid spatula, the latter having an upper side from which a protrusion emerges that, during scraping, meets the scraped away product and deflects the scraped away product forwards to promote the rolling up thereof.

BRIEF DESCRIPTION OF THE DRAWINGS

The invention can be better understood and implemented with reference to the attached drawings that illustrate an embodiment thereof by way of non-limiting example.

FIG. 3 is a side view of the spatula of FIG. 1.

DETAILED DESCRIPTION

Figure 1:
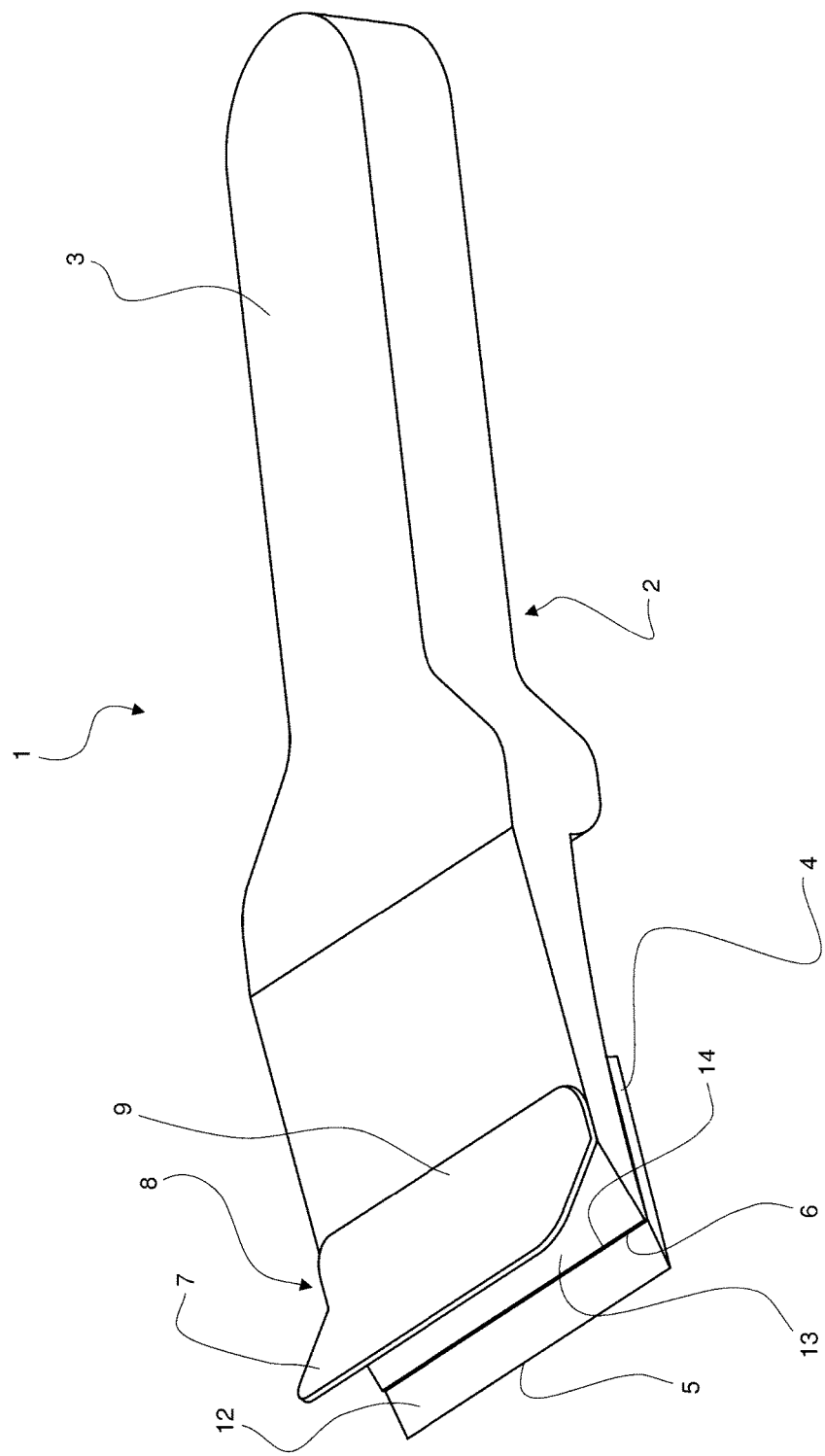
FIG. 1 is a perspective view of an embodiment of a spatula for culinary use made according to the invention.
Figure 2:
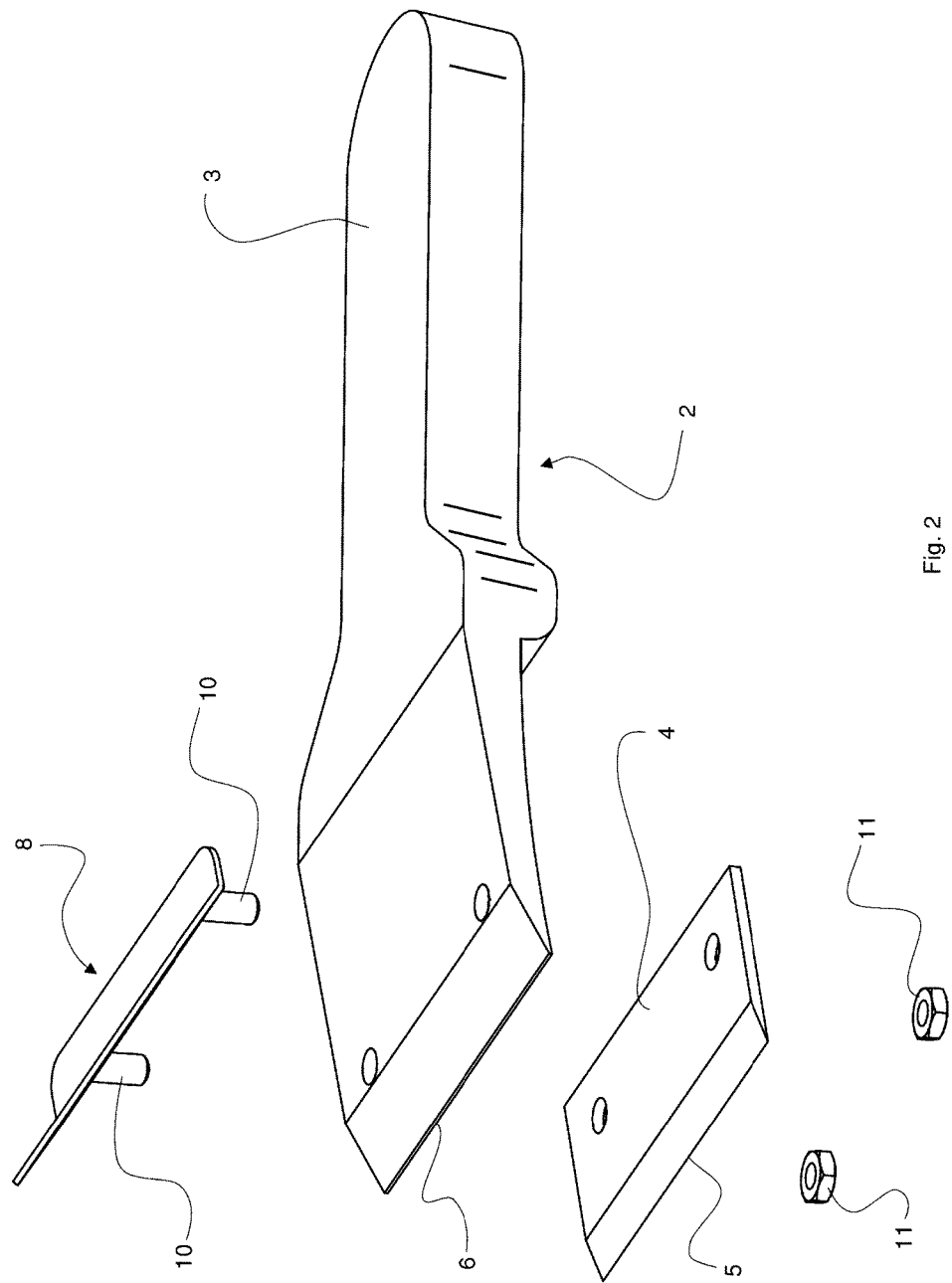
FIG. 2 is an exploded view of the spatula of FIG. 1.

With reference to the aforesaid figures, with 1 a spatula for culinary use has been indicated overall.

The spatula 1 can comprise, as in this embodiment, a spatula body 2 made of plastics for foodstuffs. The spatula body 2 can be made, for example, of a single body. The spatula body 2 can comprise, in particular, a handle 3 arranged at a first end of the spatula. The handle 3 can have, in particular, a greater thickness and/or a lesser width than the rest of the spatula body 2.

The spatula 1 can comprise, for example, an insert 4 made of metal (for example of stainless steel) and removably fixed to the spatula body 2.

The insert 4 can comprise a scraping edge 5 arranged at a second end of the spatula 1 opposite the first end.

The scraping edge 5 can comprise, in particular, a sharpened and/or hardened blade. The use of a sharpened and/or hardened blade for scraping avoids, or at least reduces significantly, the transfer of (metal) material from the spatula to the food product, for example compared with a spatula with a non-sharpened and/or non-hardened scraping edge, in which the greater friction increases the risk of transfer of material.

The insert 4 can comprise, as in the illustrated embodiment, a blade sharpened with a chiselled chamfer. The insert 4 can comprise, in particular, a blade sharpened with a sharpening angle that, during the sharpening operation, remains comprised between 15° and 30° (for example comprised between 20° and 25°), in particular with sharpening on abrasive stone or diamond-tipped stone, for example with grain that is finer than 200 grit.

The spatula body 2 can comprise, in particular, a further edge 6 that is usable when the insert 4 is removed.

The spatula 1 can comprise, as in this embodiment, a protrusion 7 that emerges from an upper side of the spatula 1. The protrusion 7 can be fixed in a removable manner to the spatula body 2.

The protrusion 7 can comprise, as in this case, a wall (for example flat) extending in width about as much as the scraping edge 5. The protrusion 7 can be included, as in this embodiment, in a metal element 8 (for example stainless steel) made of a single piece, in particular having a plate shape folded at an angle. This element 8 can comprise a fixing wing 9 in contact with the spatula body 2. The protrusion 7 can be, in particular, integral with the fixing wing 9.

The protrusion 7 can be connected to the insert 4 by at least one stem 10 inserted into a corresponding hole obtained in the spatula body 2. The stem 10 can be, in particular, inserted into a corresponding hole of the insert 4. The stem 10 can comprise a threaded part (screw) and can be coupled with a threaded fixing member 11 (nut) so as to make a bolt fixing device (bolt) for removably fixing the protrusion 7 and the insert 4 to the spatula body 2. In the specific case the protrusion 7 is connected to the insert 4 by two (threaded) stems 10 inserted into two corresponding holes obtained in the spatula body 2 and into two corresponding holes obtained in the insert 4, with the arrangement of two corresponding (threaded) fixing members 11. Each stem 10 can be, as in this embodiment, integral with the element 8, in particular with the fixing wing 9.

The upper side of the spatula 1 can comprise, as in this embodiment, a (front) metal surface 12 and a (rear) surface made of plastics for foodstuffs 13 arranged contiguously to one another. The metal surface 12 is bounded at the front by the scraping edge 5 and behind by an edge 14 that is contiguous with the surface made of plastics for foodstuffs 13. In particular, the rear edge 14 of the metal surface 12 will be contiguous with the further edge 6 of the spatula body 2. The protrusion 7 can emerge, as in this case, from the surface made of plastics for foodstuffs 13. In particular, the protrusion 7 can emerge obliquely from the upper side of the spatula.

The spatula body 2 can have, as in this case, a concave curved lower side 15. The curved lower side 15 can be arranged on a front portion of the spatula body 2, which is thinner than a thicker rear portion of the spatula body 2 where the handle 3 is arranged.

The spatula 1 can be used, in particular, for implementing a food preparation method that can comprise the step of spreading a food product in liquid or creamy state onto a cooling (smooth) work plane (not shown) to form a layer of the food product that changes into solid or pasty state through the effect of cooling. The cooling work plane can be provided, in particular, with a refrigerating arrangement for cooling the upper surface of the work plane, for example at least to a temperature of about −18° C.

The food product can comprise, for example, a basic preparation for ice-cream (creamy substance and/or sorbet). In particular, the food product can comprise a sweet or savoury creamy substance and/or a fruit sorbet and/or a wine sorbet and/or a sorbet with a cheese and/or vegetable creamy substance and/or a basic preparation for ice-cream with an alcoholic content, etc: this list is purely by way of example and is not exhaustive.

The food preparation method can comprise the step of scraping the cooling plane (following the aforesaid spreading step) using the spatula 1 for the purpose of detaching at least one portion of the layer of frozen product.

The spatula 1 is shaped in such a manner that during the aforesaid scraping step the protrusion 7 meets the detached layer portion and deflects the portion forward in such a manner as to promote rolling up thereof. The formation of a roll (also rolled several times on itself) of food product (ice-cream) is then promoted and/or permitted that can be served instantaneously within a receptacle (for example a container for an ice-cream). The formation of a roll that is wound even several times on itself is facilitated and practically assured even without a particular skill on the cook's part.

In the specific case illustrated in the figures, the protrusion 7 comprises a flat wall having a certain tilt with respect to the upper surface (surfaces 12 and 13) of the spatula 1 defined by the metal insert 4 and by the front portion of the spatula body 2 made of plastics for foodstuffs. The angle of tilt formed by the protrusion 7 and by the upper side of the spatula 1 can be, for example, equal to about 60°, as in the attached figures. The angle of tilt can be comprised, in other embodiments that are not illustrated, between about 30° and about 90°. It is nevertheless possible to provide other angles of tilt.

The protrusion can comprise, in other embodiments that are not illustrated, a curved wall, for example curved with a concavity facing forwards.

The (metal) cooling work plane can have a temperature controlled by an adjusting arrangement (not illustrated) arranged for maintaining the temperature of the cooling plane at a desired value. In particular, this adjusting arrangement can comprise a sensor arrangement for measuring an indicative temperature of the surface of the work cooling plane. This sensor arrangement can comprise, for example, at least one temperature sensor arranged on the lower side of the work cooling plane.

In particular, the adjusting arrangement can comprise a display (arranged for example next to the work cooling plane) to show the cook the actual temperature value measured by the sensor arrangement. In this manner the cook can read directly on the display the actual measured temperature and consequently start to prepare a roll of ice-cream, if the temperature is suitable, or wait for the temperature to reach a suitable value before preparing the ice-cream. The cook can also, if necessary, modify the setting of the adjusting arrangement by decreasing or increasing the desired temperature (by a control arrangement, in particular of manual type, such as for example plus and minus adjusting buttons).

The adjusting arrangement can comprise, for example, at least one thermostatic valve connected to a thermostat. The thermostatic valve can be operationally associated, in particular, with a refrigerating plant circuit (which is not illustrated) that cools the cooling work plane. This circuit can comprise, for example, at least one conduit for the refrigerating fluid arranged in a cooling coil below the cooling plane. The temperature sensor can be arranged, for example, in a central zone of the cooling coil. The adjusting arrangement can be adjusted to reach temperatures comprised between +10° C. and −25° C.

In order to prepare a roll of ice-cream (creamy substance and/or sorbet), the cook can set, for example, a desired temperature value of about −18° C. The desired temperature can vary according to the type of food product being prepared.

The spatula body 2 can be used alone and/or without the insert 4 and/or without the protrusion 7, in order to scrape away the solid or pasty product from the cooling plane (using in particular the scraping further edge 6) and/or to spread the liquid or creamy product on the cooling plane.

What is claimed is:

1. A food preparation method comprising the steps of:
   spreading a food product in liquid or creamy state on a cooling plane to form a layer of food product that changes to solid or pasty state through the effect of cooling; and
   subsequently scraping said cooling plane using a spatula to detach at least one portion of said layer, wherein said spatula includes at least three parts that can be separated from each other and that are a spatula body made of plastics for foodstuffs, an insert made of metal removably fixed to a lower side of said spatula body, and an element made of metal removably fixed to an upper side of said spatula body, a scraping edge of said spatula being arranged on said insert, said insert including an upper surface that is bounded at the front by said scraping edge and behind by a rear edge, said rear edge being contiguous to an upper surface of said upper side of said spatula body, said element including a protrusion that emerges from said upper surface of said upper side of said spatula body at a distance from said rear edge, a portion of said spatula body being interposed between said element and said insert, said element being connected to said insert by means of at least one stem inserted into a hole obtained in said portion of said spatula body;
   wherein, during said scraping step, said protrusion meets said detached layer portion and deflects the portion to promote rolling up thereof.

2. The method according to claim 1, wherein said food product comprises a basic preparation for ice-cream.

3. The method according to claim 1, wherein said scraping edge comprising a sharp cutting edge.

4. The method according to claim 1, wherein said spatula body comprises a further edge used to scrape when said insert is removed.

5. The method according to claim 1, wherein said spatula body has a concave curved lower side.

6. The method according to claim 1, wherein, said protrusion emerging obliquely from said upper surface of said upper side of said spatula body made of plastics for foodstuffs.

7. The method according to claim 1, wherein said cooling plane has a temperature controlled by an adjusting arrangement comprising at least a sensor arrangement for measuring a temperature and a display for showing a measured temperature value.

8. The method of claim 1, wherein said element forms an acute angle with respect to said upper surface of said upper side of said spatula body.

9. The method of claim 1, wherein said element forms an acute angle with said upper surface of said insert.

10. The method of claim 1, wherein said element extends beyond spatula body.

11. A food preparation method comprising the steps of:
    spreading a food product in liquid or creamy state on a plane to form a layer of food product that changes to solid or pasty state through cooling;
    scraping said cooling plane using a spatula to detach a portion of said layer, wherein said spatula includes:
    a spatula body made of plastics for foodstuffs, an insert removably affixed to a lower side of said spatula body by a fastener, and an element removably affixed to an upper side of said spatula body by said fastener;
    said insert having a scraping edge, said insert further including an upper surface bounded by said scraping edge and by a rear edge, said rear edge being contiguous to an upper surface of said upper side of said spatula body;
    said element including a linear protrusion forming an acute angle with said upper surface of said upper side of said spatula body, a portion of said spatula body being interposed between said element and said insert;
    wherein, during said scraping step, said protrusion meets said detached layer portion and deflects the portion to promote rolling up thereof.

12. The method of claim 11, wherein said protrusion extends beyond said rear edge.

13. The method of claim 11, wherein said scraping edge is metallic.

14. The method of claim 11, wherein said spatula body includes a further edge contiguous to the scraping edge.

15. The method of claim 11, wherein said protrusion is directed towards said detached layer portion.

* * * * *